US008595808B2

(12) United States Patent
Langley (10) Patent No.: US 8,595,808 B2
(45) Date of Patent: Nov. 26, 2013

(54) METHODS AND SYSTEMS FOR INCREASING THE SECURITY OF NETWORK-BASED TRANSACTIONS

(75) Inventor: Richard Jay Langley, Vienna, VA (US)

(73) Assignee: Daon Holdings Limited, George Town (KY)

( * ) Notice: Subject to any disclaimer, the term of this patent is extended or adjusted under 35 U.S.C. 154(b) by 25 days.

(21) Appl. No.: 13/328,080

(22) Filed: Dec. 16, 2011

(65) Prior Publication Data

US 2013/0160100 A1    Jun. 20, 2013

(51) Int. Cl.
*G06F 7/04* (2006.01)
(52) U.S. Cl.
USPC .............................................. 726/7
(58) Field of Classification Search
USPC ............................................. 726/2, 4, 7, 21
See application file for complete search history.

(56) References Cited

U.S. PATENT DOCUMENTS

| 2006/0200855 | A1  |   | 9/2006 | Willis |          |
|--------------|-----|---|--------|--------|----------|
| 2010/0115607 | A1  | * | 5/2010 | Pratt et al. | 726/18 |
| 2010/0131273 | A1  |   | 5/2010 | Aley-Raz et al. |    |
| 2011/0276492 | A1  | * | 11/2011 | Graves et al. | 705/50 |
| 2011/0277024 | A1  |   | 11/2011 | Begley et al. |    |
| 2013/0055362 | A1  | * | 2/2013 | Rathbun | 726/5 |

FOREIGN PATENT DOCUMENTS

| EP | 2 285 067 A1 | 2/2011 |
| EP | 2 343 677 A1 | 7/2011 |
| WO | WO 2007/113669 | 10/2007 |

OTHER PUBLICATIONS

Extended European Search Report for counterpart EPO Application No. 12195977.9 dated Mar. 25, 2013, pp. 1-8.

* cited by examiner

*Primary Examiner* — Brandon Hoffman
*Assistant Examiner* — Anthony Brown
(74) *Attorney, Agent, or Firm* — Kevin McDermott, Esq.

(57) ABSTRACT

A method for enhancing the security of systems and resources involved in conducting network-based transactions on mobile communications devices includes comparing authentication data requested to be captured from a user as part of an authentication transaction against authentication data anticipated by the user to be captured during the authentication transaction. The method also includes authenticating the requested transaction when the user decides that the requested authentication data agrees with the anticipated authentication data, and conducting a network-based transaction from a mobile communications device, if the user is authorized, after successfully authenticating the identity of the user.

19 Claims, 5 Drawing Sheets

| No. | ENROLLMENT PHRASES 62 |
|---|---|
| 62-1 | My voice is my password, please withdraw between 0 and $1000 from Local Bank & Trust and deposit in Local Citizen's Bank |
| 62-2 | My voice is my password, please withdraw between $1000 and $5000 from Local Bank & Trust and deposit in Telephone Company |
| 62-3 | My voice is my password, please withdraw over $5000 from Local Bank & Trust and deposit in Local Citizen's Bank |
| 62-n | My voice is my password, please withdraw between 0 and $1000 from Local Bank & Trust and deposit in Electric Company |

| SOURCE ENTITIES 66 | DESTINATION ENTITIES 68 |
|---|---|
| Local Bank & Trust | Local Bank & Trust |
| Local Citizens Bank | Local Citizens Bank |
| Best Employee's Bank | Best Employee's Bank |
|  | Good American Bank |
| Unregistered Entity | Electric Company |
|  | Telephone Company |
|  |  |
|  | Unregistered Entity |

| No. | LIVE-NESS DETECTION PHRASES 72 |
|---|---|
| 72-1 | My dog Sparky is best |
| 72-2 | I want a bee-bee gun for Christmas |
| 72-m | George Washington was first president |

| TRANSACTIONS 26 | VALUE RANGE 28 | LEVEL OF RISK 30 | AUTHENTICATION DATA REQUIREMENT 34 |
|---|---|---|---|
| Withdrawal from Account | $0-999 | Low | PIN |
| | $1000-5000 | Medium | Voice |
| | > $5000 | High | Voice, Face and Palm |
| Purchase with credit card | $0-999 | Low | PIN |
| | $1000-5000 | Medium | Voice |
| | > $5000 | High | Voice, Face and Palm |

FIG. 9

METHODS AND SYSTEMS FOR INCREASING THE SECURITY OF NETWORK-BASED TRANSACTIONS

BACKGROUND OF THE INVENTION

This invention relates generally to methods and systems for increasing the security of network-based transactions, and more particularly, to methods and systems for increasing the security of network-based transactions initiated from, and conducted on, mobile communications devices.

Man-in-the-browser attacks are generally conducted by imposters to perpetuate fraudulent network-based transactions. In such attacks the browser software is compromised such that after an authorized user gains access over the internet to a service provider system by, for example, entering a proper username and password, the compromised browser is able to intercept and manipulate communications between the authorized user and the server provider system. As a result, legitimate network-based transactions to the service provider system that are initiated by the user become morphed by the compromised browser software into fraudulent network-based transactions, unbeknownst to the user. This is possible because the compromised browser can convert all confirmation messages back from the service provider into messages that are consistent with what the user is expecting based on the original legitimate transaction. Thus, by virtue of providing authorizations for seemingly legitimate network-based transactions authorized users may unwittingly be providing authorization for fraudulent network-based transactions. Such fraudulent transactions may include transferring large sums of money from the authorized user's account to an account of the imposter. Because communications between the user and the service provider system seem proper while the fraud is perpetuated, users are unaware of the fraud and become unwitting participants in the fraudulent transaction.

Out-of-band communication techniques offer increased security against such man-in-the-browser attacks by virtue of using two different devices for communicating over two different channels while conducting network-based transactions. The different devices are generally a personal computer and a mobile communications device that execute different applications. Users typically operate the personal computer to initiate a network-based transaction with the service provider system and operate the mobile communications device to conduct an authentication transaction with an authentication system. The personal computer and the mobile communications device each define a different communications channel. Imposters conducting man-in-the browser attacks generally do not have access to both channels so it is significantly more difficult for them to compromise both communications channels. As a result, out-of-band communications techniques have been known to effectively defeat such man-in-the-browser attacks to thereby provide very high security for network-based transactions.

However, by virtue of requiring two different devices and associated channels, conducting network-based transactions using out-of-band techniques has been known to be inconvenient and expensive. Moreover, operating two different applications on the personal computer and the mobile communications device has been known to be difficult and confusing. As a result of rapid mobile communications device adoption rates, mobile communications devices are increasingly being used as the second out-of-band device to authenticate transactions. However, with more and more network-based transactions being initiated from mobile communications devices, this out-of-band protection is lost because the same mobile communications device is used for initiating and authenticating the transaction. Compromising this single mobile communications device has been known to render network-based transactions vulnerable to man-in-the-browser attacks. Consequently, network-based transactions initiated from, and conducted on, mobile communications devices have been known to enjoy less security than those conducted using out-of-band communication techniques.

Independent of the trend toward initiating more and more transactions from mobile communications devices, service providers have been known to integrate the authentication processes for personal computer based applications to make the overall business process easier for users. However, doing so does not offer the same protection as out-of-band communications techniques because attackers need compromise only one device to hack the system.

BRIEF DESCRIPTION OF THE INVENTION

In one aspect, a method for increasing the security of network-based transactions is provided. The method includes requesting to conduct a network-based transaction from a mobile communications device requiring access to resources controlled by a service provider system. Moreover, the method includes determining authentication data to be captured based on the requested transaction at an authentication system, including the authentication data to be captured in a capture request message, and transmitting the capture request message to the mobile communications device. The method also includes determining whether authentication data to be captured, that is included in the capture request message, agrees with authentication data anticipated for the requested transaction. When the authentication data to be captured in the capture request message agrees with the anticipated authentication data, authentication data is captured from a user of the mobile communications device in accordance with the capture request message. Furthermore, the method includes transmitting the captured authentication data to the authentication system, comparing the received authentication data against enrollment authentication data of the user and successfully authenticating the user when the received and enrollment authentication data match. Additionally, the method includes conducting the requested transaction after successfully authenticating the user.

In another aspect, a system for increasing the security of network-based transactions conducted on mobile communications devices is provided. The system includes a mobile communications device for capturing authentication data during authentication transactions and for conducting network-based transactions. Moreover, the system includes a service provider system associated with an entity engaged in controlling access to resources and including a database. The service provider computer system is configured to control access to resources relating to users enrolled therein and to conduct network-based transactions. Moreover, the system includes an authentication system including an authentication database.

The authentication system is configured to communicate with the mobile communications device and the service provider system over a network, and store at least enrollment authentication data of a plurality of users and live-ness detection data. Moreover, the authentication system is configured to determine authentication data requirements and live-ness detection data, include at least the authentication data requirement in a capture request message, and transmit the capture request message to the mobile communications device which displays authentication data included in the capture request message for the user to see. Furthermore, the authentication system is configured to authenticate the user when authentication data requested to be captured by the user, with the mobile communications device, agrees with authentication data anticipated for the requested transaction.

In yet another aspect, a method for enhancing the security of systems and resources involved in conducting network-based transactions on mobile communications devices is provided. The method includes comparing authentication data requested to be captured from a user as part of an authentication transaction against authentication data anticipated by the user to be captured during the authentication transaction. Moreover, the method includes authenticating the requested transaction when the user decides that the requested authentication data agrees with the anticipated authentication data, and conducting a network-based transaction from a mobile communications device, if the user is authorized, after successfully authenticating the identity of the user.

DETAILED DESCRIPTION OF THE INVENTION

Figure 1:
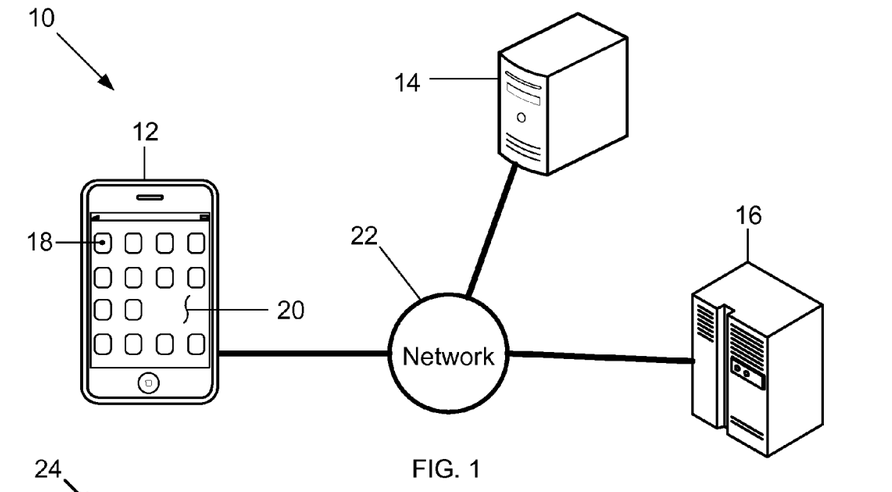
FIG. 1 is a block diagram of an exemplary embodiment of an authentication computer system for increasing the security of network-based transactions.

FIG. 1 is a block diagram of an exemplary embodiment of a system architecture of an Authentication Computer (AC) System 10 for increasing the security of network-based transactions initiated from, and conducted on, mobile communications devices. More specifically, the AC system 10 includes a Mobile Communications (MC) Device 12, a Service Provider (SP) System 14, and a Biometric Authentication Computer (BAC) System 16.

The MC device 12 is a smart phone that stores applications and data therein, and displays at least one of text and images. The MC device 12 may include at least one of buttons and icons 18 for at least entering commands and invoking applications stored therein, and a display screen 20 such as, but not limited to, a Liquid Crystal Display (LCD), that displays at least one of text and images. Moreover, the MC device 12 may include cameras (not shown) and a microphone (not shown).

Applications stored in the MC device 12 may include a security application that causes the communications device 12 to conduct at least authentication transactions.

Although the MC device 12 is a smart phone in the exemplary AC system 10, the MC device 12 may alternatively be any device capable of at least storing data, displaying at least one of text and images, and capturing and transmitting data. Such other devices include, but are not limited to, a portable cellular phone, a tablet computer, a laptop computer, a personal computer, and any type of portable communications device having wireless capabilities such as a personal digital assistant (PDA).

The MC device 12 is configured to communicate with the SP system 14, the AC system 16, other systems (not shown), and devices (not shown) over a communications network 22. The communications network 22 is a 3G communications network. Alternatively, the communications network 22 may be any wireless network including, but not limited to, 4G, Wi-Fi, Global System for Mobile (GSM), Enhanced Data for GSM Evolution (EDGE), and any combination of a local area network (LAN), a wide area network (WAN) and the Internet. Moreover, the MC device 12 is configured to conduct wireless communications such as cellular telephone calls and to wirelessly access the Internet over the network 22. The network 22 may also be any type of wired network.

The MC device 12 may be used to capture authentication data during authentication transactions. When the authentication data is biometric data, the MC device 12 may determine whether captured biometric data is of sufficient quality for conducting an authentication transaction, and transmit the captured biometric data to the BAC system 16 after determining it is of sufficient quality. Furthermore, the MC device 12 may process the captured biometric data prior to transmitting it to the BAC system 16. For example, the MC device 12 may capture biometric data, compress it, and then transmit the compressed data to the BAC system 16. Alternatively, the MC device 12 may create a biometric template from the captured biometric data, and then transmit the biometric template to the BAC system 16. Although the AC system 10 includes one MC device 12, the AC system 10 may alternatively include any number of MC devices 12 that are each associated with a same or different user.

The SP system 14 is a computer including components such as, but not limited to, a database server, an application server, a directory server, a web server, and a disk storage unit that may be used to store any kind of data. The disk storage unit may store at least one database. The SP system 14 is configured to at least communicate with the MC device 12 and the BAC system 16 over the network 22, and control access to resources stored therein. Resources as described herein include anything that may be protected against access by unauthorized users. Consequently, resources may include, but are not limited to, financial accounts, data of any type and of any form, electronic artifacts, services, computer systems, applications, buildings, rooms within buildings, and automobiles.

Electronic artifacts include items such as, but not limited to, web documents. Services include, but are not limited to, checking-out an electronic shopping cart at a website and conducting a payment transaction. Computer systems include, but are not limited to, virtual private networks and such other networks or computer systems running such networks. Applications as described herein are computer programs. For example, applications as described herein may include, but are not limited to, applications that facilitate performing privileged communications and applications that permit access to privileged information. It should be understood that such applications are made available to a user only upon authentication of the identity of the user. Moreover, it should be understood that by virtue of protecting the applications, the functions performed by those applications are also protected. Thus, by virtue of granting access to applications upon authentication of the identity of the user, access is also granted to the functions performed by those applications. Consequently, it should be appreciated that functions caused to be performed on a computer or computer system by applications stored throughout the AC system 10, also constitute resources.

Because the SP system 14 is associated with a financial institution, the SP system 14 stores and controls access to at least the financial accounts for each of a plurality of financial institution customers and facilitates conducting transactions involving the financial accounts. The SP system 14 also stores a different service provider user identifier for each customer. Moreover, the SP system 14 may store biographic data of each customer and policies for at least determining whether a user is authorized to conduct a transaction with the SP system 14. Biographic data includes any demographic information regarding an individual including, but not limited to, an individual's name, age, date-of-birth, address, citizenship and marital status. As described herein an authorized user is a customer of the financial institution having financial accounts stored in the SP system 14. Such users are authorized to access their financial accounts, and conduct transactions involving their financial accounts after being successfully authenticated.

Although the SP system 14 is associated with a financial institution, the SP system 14 is in no way limited to being associated with a financial institution. Alternatively, the SP system 14 may be associated with any type of entity. For example, the SP system 14 may be associated with a hospital and facilitate controlling access to confidential patient medical records. Although the AC system 10 includes one SP system 14 associated with a financial institution, the AC system 10 may alternatively include any number of SP systems 14 that are each associated with a same or different entity.

The BAC system 16 includes components such as, but not limited to, a web server, a database server, an application server, a directory server and a disk storage unit that may be used to store any kind of data. The disk storage unit may store at least one database such as, but not limited to, an authentication database. The BAC system 16 also includes a database management server and an authentication server. The database management server may be used to facilitate transferring data to and from the disk storage device. The authentication server performs matching of any feature or information associated with individuals to authenticate the identity of individuals as described herein.

The BAC system 16 is configured to communicate with the MC device 12, the SP system 14, other devices (not shown), and other systems (not shown) over the network 22. Moreover, the BAC system 16 may perform functions including, but not limited to, authenticating users, storing authentication policies for determining authentication data to be used during authentication transactions, storing at least authentication data of each of a plurality of authorized users in a respective enrollment data record, storing registers, and determining the live-ness of a user requesting to conduct a network-based transaction.

Authentication data is any data that may be used to authenticate the identity of individuals. For example, the authentication data may be biometric data that corresponds to any biometric modality desired to be used for verifying the identity of a user during an authentication transaction. Such biometric modalities include, but are not limited to, face, finger, iris, voice and palm, and any combination of face, finger, iris, voice and palm. The biometric data may take any form such as, but not limited to, photographic images and voice recordings. Voice biometric data may be recitations of information that is not publicly known, such as, but not limited to, information personal to respective users. Alternatively, authentication data may be non-biometric data. For example, authentication data may be information known only to respective users such as, but not limited to, personal identification numbers (PINs) and passwords. PINs and passwords may be alphanumeric or numeric character strings of any length.

The enrollment data record of each authorized user stored in the BAC system 16 includes at least enrollment authentication data, a unique user identifier, and the service provider user identifier of the respective authorized user. Enrollment authentication data is authentication data obtained from the user during enrollment in the BAC system 16. Phrases may be recited by a user during enrollment in the BAC system 16 and included in the enrollment authentication data as voice biometric data. The unique user identifier and service provider user identifier are alphanumeric character strings of any length and are different. By virtue of being stored in the same enrollment data record, the enrollment authentication data, the unique user identifier, and the service provider user identifier of each authorized user are associated with each other. Alternatively, such data may be stored in separate records with links to each other. Biographic data may also be included in the enrollment data records.

Although the SP system 14 and the BAC system 16 are described as separate computer systems included in the AC system 10, the SP system 14 and the BAC system 16 may alternatively be combined into a single computer system that is included in the AC system 10.

The MC device 12, the SP system 14 and the BAC system 16, respectively, each include a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processors execute instructions, or computer programs, stored in the respective memories (not shown) of the MC device 12, the SP system 14, and the BAC system 16. The above examples are exemplary only, and are thus not intended to limit in any way the definition and/or meaning of the term "processor."

The respective memories (not shown) in the MC device 12, the SP system 14, and the BAC system 16 can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

Each of the memories (not shown) can be a computer-readable recording medium used to store data, respectively, in the MC device 12, the SP system 14, and the BAC system 16. Moreover, each of the respective memories (not shown) can be a computer-readable recording medium used to store computer programs or executable instructions that are executed, respectively, by the MC device 12, the SP system 14, and the BAC system 16. Moreover, the memories (not shown) may include smart cards, SIMs or any other medium from which a computing device can read computer programs or executable instructions. As used herein, the term "computer program" is intended to encompass an executable program that exists permanently or temporarily on any computer-readable recordable medium that causes the computer or computer processor to execute the program and thus causes the computer to perform a function. Applications as described herein are computer programs.

Figure 2:
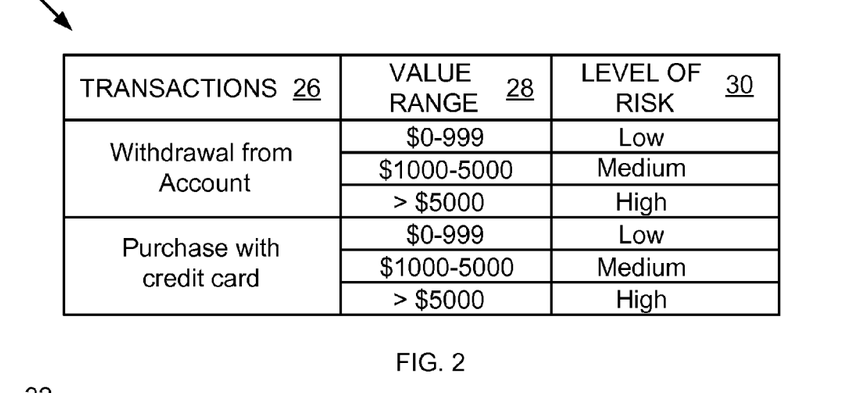
FIG. 2 is a diagram illustrating an exemplary transaction policy that associates network-based transactions with level of risks.

FIG. 2 is a diagram illustrating an exemplary configurable transaction policy 24, stored in the SP system 14 that associates network-based transactions 26 with transaction levels of risk. More specifically, the transaction policy 24 includes network-based transactions 26, value ranges 28 for each transaction 26, and a level of risk 30 for each value range 28. The transactions 26 include making a withdrawal from a financial institution account and making a purchase with a credit card issued by the financial institution.

Each transaction 26 is subdivided into value ranges 28 during enrollment in the SP system 14. For the exemplary transaction policy 24, the value ranges 28 are $0-999, $1000-5000, and greater than $5000 for withdrawal and purchase transactions. Moreover, each value range 28 is associated with a level of risk 30 during enrollment in the SP system 14. The greater the upper limit of a value range 28, the greater the level of risk 30 of the transaction. Thus, transactions 26 having a value range 28 of between $0 and $999 are associated with a low level of risk 30, those having a value range 28 of between $1000 and $5000 are associated with a medium level of risk 30, and those having a value range 28 greater than $5000 are associated with a high level of risk 30. The levels of risk 30 define degrees of risk for network-based transactions 26 desired to be conducted by a user. The levels of risk 30 are defined as low, medium, and high. However, the levels of risk 30 may be defined in any manner. For example, the levels of risk 30 may be defined as none, lowest, low, high, and highest. The value ranges 28 and corresponding levels of risk 30 are determined by the entity associated with the SP system 14. Alternatively, the value ranges 28 and levels of risk 30 may be determined by the user, or by both the user and the entity associated with the SP system 14.

The exemplary transaction policy 24 may include network-based transactions 26 relating to any type of activity of any entity. Some network-based transactions 26 may not be associated with a value range 28. For example, a network-based transaction 26 for accessing a room through a door in a building is not associated with a value range 28. The level of risk 30 for transactions without a value range 28 may be determined in any manner. For instance, the level of risk 30 for a transaction requesting access to a door may be based on factors such as which door, of several different doors, in a building is requested to be accessed by a user. Thus, the levels of risk 30 may be based on factors, relevant to a requested transaction, that are different than value ranges 28.

The exemplary transaction policy 24 may include any number of network-based transactions 26 and may be reconfigured by the user or the entity associated with the SP system 14. The transaction policy 24 may also be reconfigured by both the user and the entity associated with the SP system 14, in any manner. For example, when the user and the entity associated with the SP system 14 implement different transaction policies 24, the policy including the most rigorous levels of risk may be used.

The information shown in FIG. 3 includes some of the same information shown in FIG. 2 as described in more detail below. As such, features illustrated in FIG. 3 that are identical to features illustrated in FIG. 2 are identified using the same reference numerals used in FIG. 2.

Figure 3:
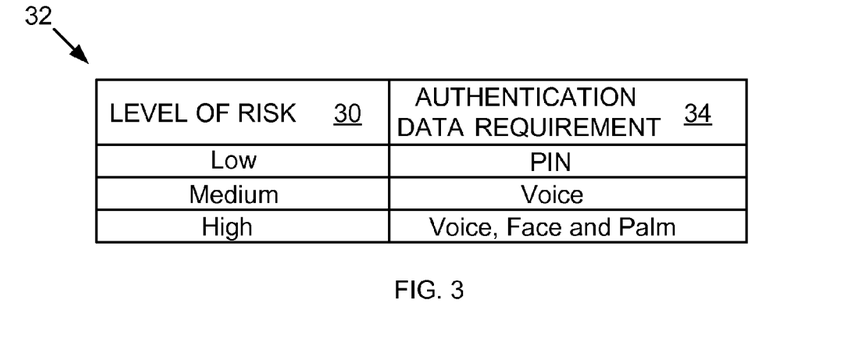
FIG. 3 is a diagram illustrating an exemplary authentication policy that associates the transaction levels of risk illustrated in FIG. 2 with authentication data requirements.

FIG. 3 is a diagram illustrating an exemplary configurable authentication policy 32 that is stored in the BAC system 16, and is for associating the levels of risk 30 with corresponding authentication data requirements 34. The authentication policy 32 associates an authentication data requirement 34 with each network-based transaction 26 based on the level of risk 30 of the network-based transactions 26.

The authentication data requirement 34 is the authentication data to be captured from a user during an authentication transaction, and corresponds to the level of risk 30 determined for a network-based transaction 26 desired to be conducted by a user. Transactions 26 having a low level of risk 30 require a personal identification number (PIN), for example, 1397. Transactions having a medium level of risk 30 require text dependent voice biometric data, and those transactions having a high level of risk 30 require voice, face, and palm biometric data. Text dependent voice biometric data is voice biometric data that is matched against a pre-recorded phrase using the same text.

Instead of requiring biometric data of different modalities as the level of risk increases, the authentication data requirement 34 may alternatively include different types of the same biometric modality. For example, the authentication data requirement 34 for the medium and high levels of risk 30 may be right thumb, and left and right index fingerprints, respectively. The higher the level of risk 30, the more demanding the authentication data requirement 34. The authentication data requirement 34 may be made more demanding in any manner such as, but not limited to, increasing the number of different biometric modalities, increasing the number of different types of biometric data of a same biometric modality, or choosing data types that are more difficult to compromise than data types of requirements 34 associated with lesser levels of risk 30.

The authentication policy 32 may be reconfigured by changing the definitions of the levels of risk 30 and authentication data requirements 34 in any manner that facilitates increasing the security of network-based transactions 26 as described herein. For example, the authentication data requirement 34 for the low, medium, and high levels of risk 30 may be reconfigured to each require a different PIN. For example, the PINs for the low, medium, and high levels of risk 30 may be 1397, 4596, and 2493, respectively. Moreover, the PINs may be configured so that after a PIN is used, it is replaced with a new different PIN that is also different from other PINs included in the authentication policy 32. Any number of different authentication policies 32 may be generated and stored in the BAC system 16. The authentication policies 32 may alternatively, or additionally, be stored in the SP system 14.

Figure 4:
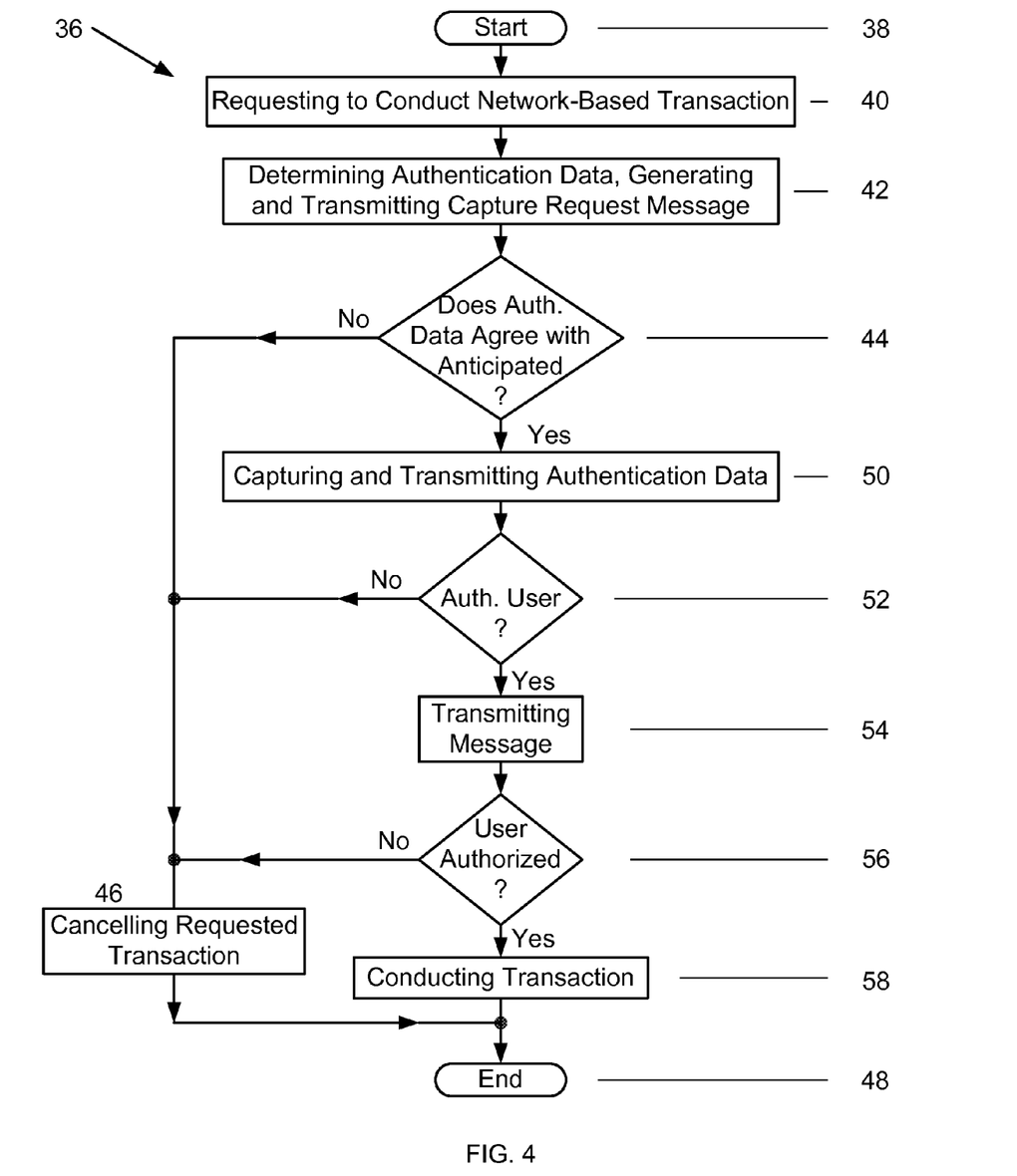
FIG. 4 is a flowchart illustrating an exemplary security process for increasing the security of network-based transactions.

FIG. 4 is a flowchart 36 illustrating an exemplary security process used by the AC system 10 for increasing the security of network-based transactions initiated from, and conducted on, MC devices 12. For the AC system 10 the process starts 38 with a user of an MC device 12 requesting 40 to conduct a network-based transaction requiring access to at least one resource controlled by the SP system 14. In response, the SP system 14 continues processing by determining the level of risk for the requested transaction, generating an authentication request message, and transmitting the authentication request message to the BAC system 16. The authentication request message includes at least the determined level of risk and the service provider user identifier of the requesting user. Next, the BAC system 16 continues processing by determining 42 the authentication data requirement for the requested transaction based on the determined level of risk, generating 42 a capture request message that includes at least the authentication data requirement, and transmitting 42 the capture request message to the MC device 12. In this exemplary security process, the determined level of risk is low which corresponds to an authentication data requirement of a PIN. Thus, the requesting user anticipates providing his PIN, 1397, as authentication data. After receiving the capture request message, the MC device 12 continues by displaying the authentication data requirement included in the capture request message on the screen 20 for the user to see.

The requested transaction may have been intercepted and manipulated into a fraudulent transaction by a man-in-the-browser attack during transmission from the MC device 12 to the SP system 14. Thus, the fraudulent transaction may be pending at the SP system 14 instead of the requested transaction. The fraudulent transaction may have a different level of risk and thus have a different authentication data requirement than the requested transaction. Consequently, the displayed authentication data requirement may be that for the fraudulent transaction, and not the authentication data requirement for the requested transaction. Thus, before capturing authentication data in accordance with the capture request message, the user reads the screen 20 and determines whether the displayed authentication data requirement agrees with 44 that anticipated by the requesting user for the requested transaction 44. When there is a discrepancy between the anticipated authentication data and the displayed authentication data requirement, the requesting user does not capture authentication data.

The requesting user is given a time period in which to capture and transmit authentication data corresponding to the capture request message. When captured authentication data is not transmitted from the MC device 12 and received by the BAC system 16 within the time period, the BAC system 16 continues by notifying the SP system 14. Next, the SP system 14 continues by cancelling the requested transaction 46 and processing ends 48. The time period may be of any duration, for example, 30 seconds. Thus, for example, when the authentication data requirement displayed on the screen 20 is voice biometric data, the user determines that the displayed authentication data requirement does not agree with the anticipated authentication data, and that the requested transaction may have been manipulated into a fraudulent transaction as the result of a man-in-the-browser attack. Consequently, the user does not capture authentication data.

However, when the displayed authentication data requirement agrees with the authentication data anticipated by the user, the user continues processing by capturing authentication data 50 in accordance with the capture request message from his self with the MC device 12. Thus, for example, when the displayed authentication data requirement requires entering a PIN, the user determines that the authentication data requirement in the capture request message agrees with that anticipated and enters 1397 in the MC device 12.

Next, the MC device 12 automatically transmits 50 the captured authentication data to the BAC system 16. By virtue of capturing authentication data in accordance with the capture request message and transmitting the captured authentication data to the BAC system 16, the requesting user indicates that the transaction pending at the SP system 14 is believed to be the requested transaction. Such an indication is also known as authenticating the requested transaction.

In response to receiving the captured authentication data, the BAC system 16 authenticates the requesting user 52 by comparing the enrollment authentication data of the requesting user against the received authentication data and generating a matching score. The matching score is compared against a threshold to determine if the received authentication data and the enrollment authentication data match. When the matching score is at least equal to the threshold, the received authentication data matches the enrollment authentication data of the requesting user and the identity of the requesting user is successfully authenticated 52. After successfully authenticating the requesting user 52, the BAC system 16 continues processing by transmitting a successful authentication message 54 to the SP system 14 and the MC device 12 indicating that the requesting user authenticated the requested transaction and was successfully authenticated. Otherwise, when the user is not successfully authenticated 52, the BAC system 16 continues processing by transmitting a message to the SP system 14 and the MC device 12 indicating that the user was not successfully authenticated. Next, the SP system 14 continues processing by cancelling the requested transaction 46 and processing ends 48.

In response to receiving the successful authentication message, the SP system 14 continues processing by determining whether the requesting user is authorized 56 to conduct the requested network-based transaction in accordance with policies stored therein. When the requesting user is authorized 56, processing continues by permitting the requesting user to continue by conducting the requested network-based transaction 58. Next, processing ends 48. Otherwise, when the requesting user is not authorized 56, processing continues by cancelling the requested transaction 46 and processing ends 48.

Although the authentication data requirement 34 for a low risk transaction in the exemplary security process requires entering a PIN, in alternative exemplary security processes the authentication data requirement for the low level of risk 30 may be finger biometric data. Thus, in such alternative exemplary security processes, finger biometric data would be the authentication data anticipated by the user for the requested network-based transaction. Thus, for example, if the authentication data requirement 34 displayed on the screen 20 indicates that voice, face, and palm biometric data are to be captured, the requesting user of a low risk transaction determines that the displayed authentication data requirement is for a high risk transaction and therefore does not agree with 44 the anticipated authentication data. Consequently, the requesting user does not capture authentication data, the BAC system 16 notifies the SP system 14, and the SP system 14 continues by cancelling the requested transaction 46. Next, processing ends 48.

However, when the requesting user of a low risk transaction determines that the displayed authentication data requirement is finger biometric data, the user determines that the displayed authentication data requirement agrees with the anticipated authentication data. Consequently, the requesting user continues by capturing authentication data 50 in accordance with the displayed authentication data requirement using the MC device 12.

Next, the MC device 12 continues by verifying that the captured authentication data is of sufficient quality. If so, the MC device 12 continues by automatically transmitting 50 the captured authentication data to the BAC system 16. Otherwise, the user repeatedly captures authentication data in accordance with the displayed authentication data requirement until authentication data of sufficient quality is captured. Upon capturing authentication data of sufficient quality, the MC device 12 continues by automatically transmitting 50 the captured authentication data to the BAC system 16. Next, these alternative exemplary security processes continue by conducting operations 52-58 and 48 as described in the exemplary security process.

Figure 5:
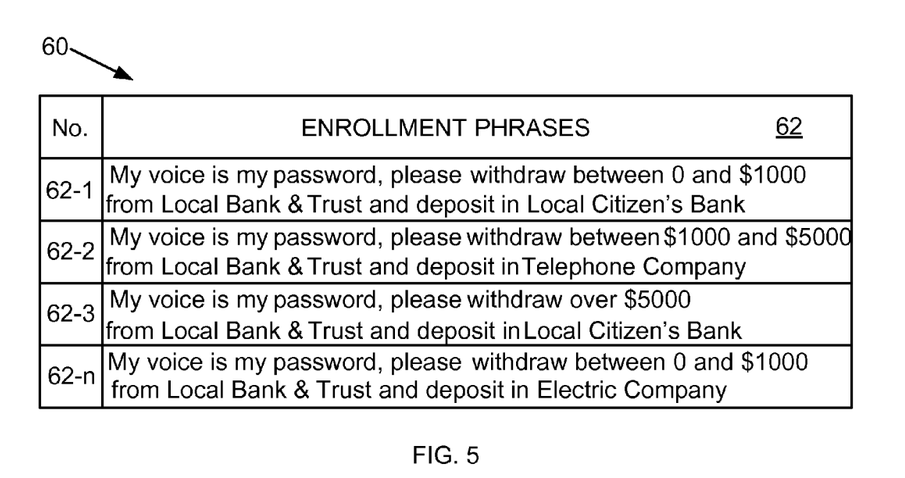
FIG. 5 is a diagram illustrating an exemplary enrollment phrase registry that includes phrases that facilitate capturing text dependent voice biometric data.

FIG. 5 is a diagram illustrating an exemplary enrollment phrase registry 60 stored in the BAC system 16 which includes phrases that facilitate capturing text dependent voice biometric data to be used in text dependent speaker recognition authentication techniques. More specifically, the phrase registry 60 includes phrases 62-1 to 62-*n* that are recited by users during enrollment in the BAC system 16 and the recitations are stored in the enrollment data records of the users. Because the phrases 62-1 to 62-*n* are used to store text dependent phrases before conducting authentication transactions, when recited during authentication transactions, the phrases 62-1 to 62-*n* facilitate increasing the matching accuracy of voice biometric data. Consequently, in alternative exemplary security processes, when voice biometric data is the authentication data to be captured, the authentication data requirement 34 displayed on the screen 20 is one of the phrases 62-1 to 62-*n*.

Each of the phrases 62-1 to 62-*n* describes details of a network-based transaction 26 a user anticipates conducting over the AC system 10 after enrollment in the BAC system 16. Consequently, in alternative exemplary security processes, the phrase 62-1 to 62-*n* that best describes the details of the requested network-based transaction 26 is the phrase used to capture text dependent voice biometric data. Thus, when the phrase displayed as the authentication data requirement on the mobile communications device 12 includes details different than those of the requested network-based transaction 26, the requesting user recognizes the discrepancy and refuses to provide the requested text dependent voice biometric data. The discrepancy may be evidence that a man-in-the-browser attack has occurred. Thus, by virtue of refusing to provide the requested voice biometric data, the user increases the security of the AC system 10 against man-in-the-browser attacks.

For example, a user requesting to initiate a network-based transaction withdrawing $2000 from his checking account at Local Bank & Trust and depositing it in his account at the Telephone Company, would anticipate providing text dependent voice biometric data by reciting the enrollment phrase 62-2, because phrase 62-2 includes the details of the requested transaction 26. When the details included in the displayed authentication data requirement agree with the details of the requested transaction, the user decides that the requested authentication data agrees with the anticipated authentication data. However, upon reading an authentication data requirement displayed on the screen 20 that indicates "transferring $500,000 from Local Bank & Trust to the First Bank of Russia," the user recognizes the discrepancy between the details of the requested transaction and the displayed authentication data requirement, and refuses to capture authentication data. As a result, by refusing to capture authentication data in accordance with the displayed authentication data requirement, the user increases the security of network-based transaction conducted on the AC system 10 against man-in-the-browser attacks.

When a requested transaction is associated with a value, the value range 28 including the transaction value is considered a detail of the transaction. Consequently, users anticipate identifying the value range 28 corresponding to the transaction value as a detail in the enrollment phrase 62. For the example described above requesting a $2000 withdrawal from Local Bank & Trust, users anticipate identifying the value range of $2000-$5000, instead of $2000, in the enrollment phrase 62-2 displayed on the screen 20. It should be appreciated that requesting text dependent voice biometric data, including the details of requested transactions, as the authentication data requirement facilitates increasing the security of transactions conducted on the AC system 10 by making it easier for users to recognize when requested authentication data agrees with that anticipated based on a requested transaction.

The designation "n," as used in conjunction with the enrollment phrases 62-*n* is intended to indicate that any number "n" of enrollment phrases may be included in the enrollment phrase registry 60 that facilitates increasing the security of network-based transactions as described herein. Moreover, the phrases 62-1 to 62-*n* may describe any kind of relevant details regarding network-based transactions 26 the user anticipates conducting over the AC system 10 after enrollment in the BAC system 16. Such relevant details include, but are not limited to, a source entity, a destination entity, and the value range 28 of a network-based transaction 26.

Figure 6:
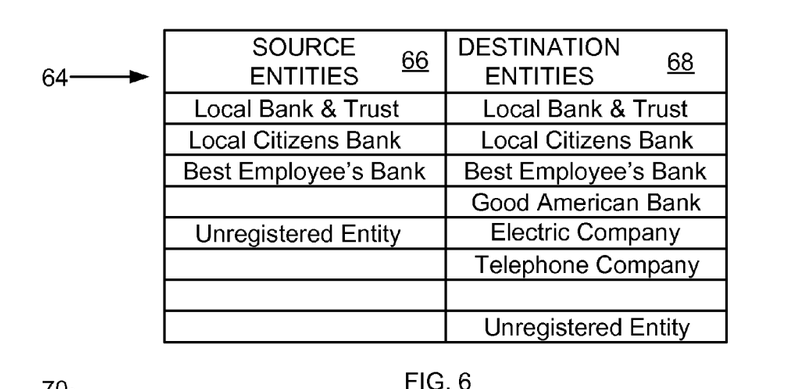
FIG. 6 is a diagram illustrating an exemplary detail registry that includes names of source and destination entities that may be included in the phrases illustrated in FIG. 5.

FIG. 6 is a diagram illustrating an exemplary detail registry 64 stored in the BAC system 16 which includes the names of source entities 66 and destination entities 68 that may be included as details in the enrollment phrases 62-1 to 62-*n*. Source entities 66 are entities that are sources of funds such as financial institution investment accounts or other repositories of fungible assets. Destination entities 68 are entities that may receive the funds withdrawn from source entities 66 as deposits or payments. The source entities 66 and destination entities 68 are defined by the user during enrollment in the BAC system 16, and represent entities that may be included in network-based transactions 26 conducted by the user after enrollment.

After enrolling in the BAC system 16, users may decide to conduct a network-based transaction 26 with an entity not included in the detail registry 64. Consequently, the source 66 and destination 68 entities each include an entity designated as Unregistered Entity. It should be understood that it is more likely that a man-in-the-browser attack may fool a requesting user into providing authorization for a fraudulent transaction when conducting transactions with unregistered entities.

Although three known source entities 66 and six known destination entities 68 are included in the exemplary registry 64, it should be appreciated that any number of source entities 66 and destination entities 68 may be included in the registry 64. Moreover, the number of source entities 66 may be different from the number of destination entities 68, and the entities included in the source entities 66 and destination entities 68 may be the same or different.

The security of network-based transactions conducted on the AC system 10 against man-in-the-browser attacks may be increased by executing live-ness checks against authentication data to ensure that the authentication data is provided by a live user, instead of being spoofed. Live-ness detection data may be randomly selected and executed when capturing authentication data to facilitate determining whether authentication data received by the BAC system 16 was captured live from the requesting user.

Figure 7:
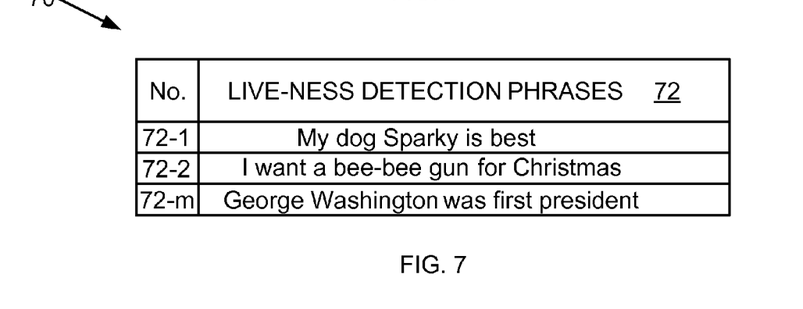
FIG. 7 is a diagram illustrating an exemplary live-ness detection phrase registry.

FIG. 7 is a diagram illustrating an exemplary live-ness detection phrase registry 70 stored in the BAC system 16, which includes non-public, live-ness detection phrases 72 that are recited by the user during enrollment in the BAC system 16 and are stored in the enrollment data record of the user. The designation "m," as used in conjunction with the live-ness detection phrases 72-*m* is intended to indicate that any number "m" of live-ness detection phrases may be included in the live-ness detection phrase registry 70 that facilitates increasing the security of network-based transactions as described herein. The phrases 72-1 to 72-*m* are not publicly known. The live-ness detection phrases 72-1 to 72-*m* constitute live-ness data that may be randomly selected and executed when capturing authentication data.

The BAC system 16 may randomly select one of the live-ness detection phrases 72-1 to 72-*m* to be executed while capturing text dependent voice biometric data during an authentication transaction. Generally, when text dependent voice biometric data is to be captured, the selected phrase 62-1 to 62-*n* is combined with one of the live-ness detection phrases 72-1 to 72-*m* to define a phrase for recitation by and capture from the user. It should be understood that any one, or any combination, of the live-ness detection phrases 72-1 to 72-*m* may be selected. Because each live-ness detection phrase 72-1 to 72-*m* is not publicly known and is randomly selected, the selected live-ness detection phrase 72-1 to 72-*m* is not known in advance to an imposter and thus appears unpredictable. Consequently, due to the number of different publicly unknown live-ness detection phrases 72-1 to 72-*m* that may be randomly selected by the BAC system 16, the randomly selected live-ness detection phrases 72-1 to 72-*m* constitute an unpredictable condition injected into authentication transactions by the BAC system 16 that facilitate making it more difficult for imposters to conduct successful man-in-the-browser attacks against network-based transactions. Due to the randomness of the selected live-ness detection phrases 72-1 to 72-*m*, these phrases 72-1 to 72-*m* may be used to facilitate determining whether authentication data was captured live from a user.

Although the live-ness detection phrase registry 70 is for text dependent voice biometric data, it should be appreciated that other registries may be stored in the BAC system 16 that include live-ness detection data for different biometric modalities, or include live-ness detection data other than biometric data, which may also constitute an unpredictable condition injected into an authentication transaction. For example, an illumination instruction registry may be stored in the BAC system 16 that includes instructions regarding illumination during authentication transactions. Any one of the illumination instructions, or any combination of the illumination instructions, may be randomly selected by the BAC system 16 to be executed while capturing biometric image data during authentication. Varying the illumination intensity or spectrum applied to presented biometric data over time while generating a sequence of photographic images or a video sequence facilitates determining whether the biometric data is captured live from a user.

The information shown in FIG. 8 includes the same information shown in FIG. 4 as described in more detail below. As such, features illustrated in FIG. 8 that are identical to features illustrated in FIG. 4 are identified using the same reference numerals used in FIG. 4.

Figure 8:
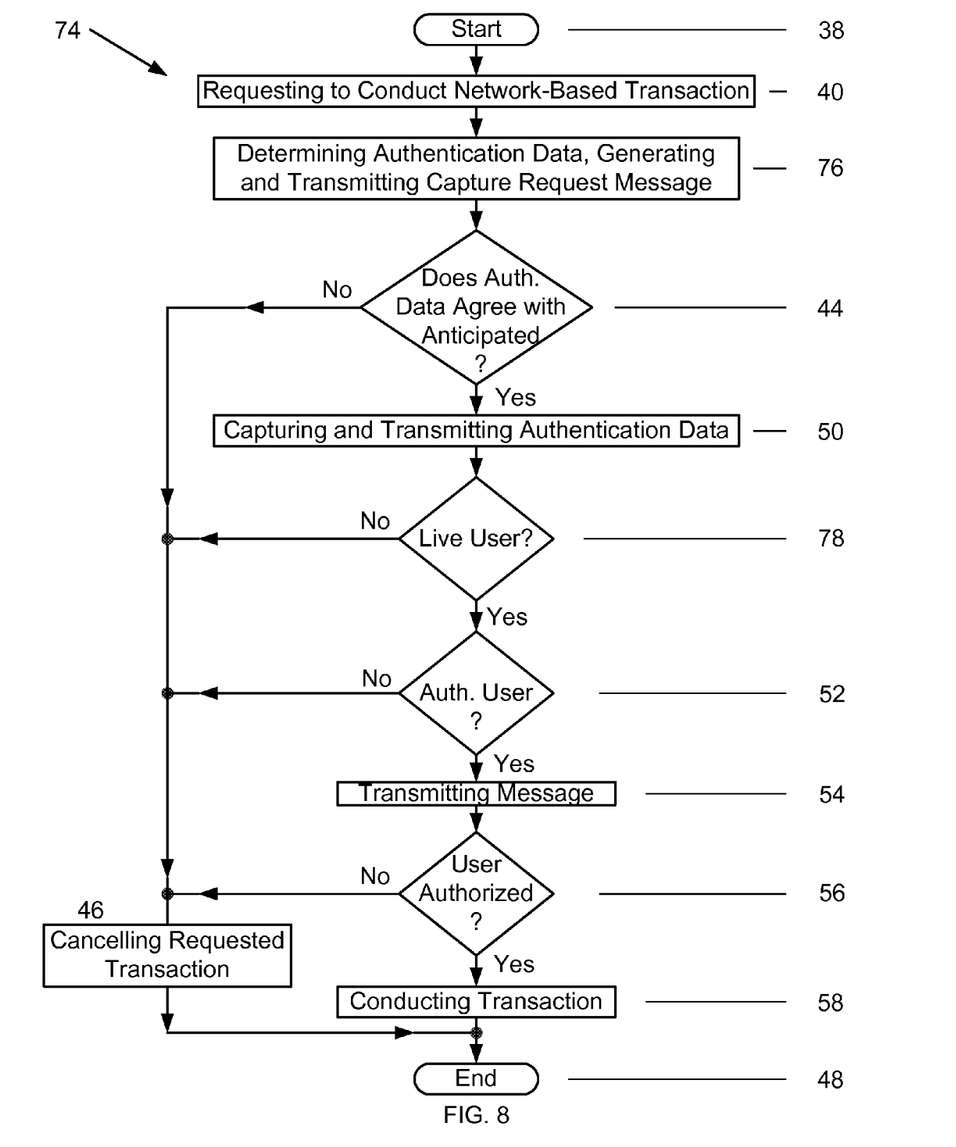
FIG. 8 is a flowchart illustrating an alternative exemplary security process for increasing the security of network-based transactions.

FIG. 8 is a flowchart 74 illustrating another alternative exemplary security process used by the AC system 10 for increasing the security of network-based transactions initiated from, and conducted on, MC devices 12. This alternative exemplary process is similar to that shown in FIG. 4. However, the authentication data requirement is text dependent voice biometric data and live-ness detection is included.

After operations 38 and 40 are conducted, the BAC system 16 continues processing by determining 76 the authentication data requirement for the requested transaction based on the determined level of risk and randomly selecting 76 live-ness detection data. In this alternative security process, the requesting user desires to conduct a network-based transaction withdrawing $2000 from his checking account at the Local Bank & Trust and depositing it in his Telephone Company account. Because the level of risk for such a transaction is medium, the BAC system 16 determines that the authentication data requirement is voice, specifically text dependent voice biometric data.

Next, the BAC system 16 continues by consulting the enrollment phrase registry 60 and determining that enrollment phrase 62-2 includes the details of the requested network-based transaction. Thus, enrollment phrase 62-2 is to be recited and captured as the authentication data requirement. Moreover, the BAC system 16 continues by randomly selecting live-ness detection phrase 72-1, "My dog Sparky is best," as the live-ness detection data. The live-ness detection data is to be executed when capturing authentication data in accordance with the authentication data requirement. Thus, during authentication, the requesting user is to recite and capture the phrase "My voice is my password, please withdraw between $1000 and $5000 from Local Bank & Trust and deposit in Telephone Company. My dog Sparky is best," as the authentication data to be captured. Next, the BAC system 16 continues processing by generating 76 a capture request message that includes at least the authentication data requirement and live-ness detection data, and transmitting 76 the capture request message to the MC device 12.

After receiving the capture request message, the MC device 12 continues by displaying the authentication data to be captured on the screen 20 for the user to see. The user continues by reading the screen 20 and determining whether the authentication data to be captured includes the details of the requested transaction and thus agrees 44 with that anticipated by the user for the requested network-based transaction. When there is a discrepancy between the anticipated and displayed authentication data to be captured, the user does not capture authentication data. Consequently, when the BAC system 16 does not receive captured authentication data before the time period expires, the BAC system 16 continues by notifying the SP system 14. Next, the SP system 14 continues by cancelling the requested transaction 46 and processing ends 48. However, when the displayed authentication data to be captured agrees 44 with that anticipated by the user, the user continues processing by capturing authentication data 50 in accordance with the capture request message from his self with the MC device 12.

Next, the MC device 12 continues by verifying that the captured authentication data is of sufficient quality. If so, the MC device 12 continues by automatically transmitting 50 the captured authentication data to the BAC system 16. Otherwise, the user repeatedly captures authentication data in accordance with the capture request message until authentication data of sufficient quality is captured. Upon capturing authentication data of sufficient quality, the MC device 12 continues by automatically transmitting 50 the captured authentication data to the BAC system 16.

After receiving authentication data, the BAC system 16 continues processing by determining, in any manner, whether the received authentication data was captured live from the requesting user 78. More specifically, the BAC system 16 continues by determining whether the live-ness detection data was executed when the received authentication data was captured. That is, the BAC system 16 determines whether recitations of phrases 62-2 and 72-1 are included in the received authentication data. If not, the BAC system 16 continues by determining that the received authentication data was not captured live 78 from the requesting user, generating a message indicating the requesting user was not authenticated, and transmitting the message to the MC device 12 and the SP system 14. Next, the SP system 14 continues processing by cancelling the requested transaction 46 and processing ends 48.

However, when the live-ness detection data was executed when the received authentication data was captured, the BAC system 16 continues processing by determining that the received authentication data was captured live from the requesting user 78. Next, the BAC system 16 authenticates the requesting user 52 by comparing the enrollment authentication data of the requesting user against the received authentication data and generating a matching score. The matching score is compared against a threshold to determine if the received authentication data and the enrollment authentication data match. When the matching score is at least equal to the threshold, the received authentication data matches the enrollment authentication data of the requesting user and the identity of the requesting user is successfully authenticated 52.

After successfully authenticating the requesting user 52, the BAC system 16 continues processing by transmitting a message 54 to the SP system 14 and the MC device 12. The message indicates that the requesting user authenticated the requested transaction and was successfully authenticated. Processing continues by conducting operations 56, 58 and 48. Otherwise, when the user is not successfully authenticated 52, the BAC system 16 continues processing by transmitting a message to the SP system 14 and the MC device 12 indicating that the user was not successfully authenticated. Next, the SP system 14 continues processing by cancelling the requested transaction 46 and processing ends 48.

Although the SP system 14 determines whether the requesting user is authorized to conduct the requested transaction after the user is successfully authenticated in the exemplary processes described herein, in yet other alternative exemplary security processes the SP system 14 may make this determination before transmitting the authentication request message to the BAC system 16. In yet other alternative exemplary security processes, the BAC system 16 may determine whether the authenticated user is authorized to conduct the requested transaction instead of the SP system 14. Moreover, although the BAC system 16 determines the authentication data requirement, randomly selects live-ness detection data, and generates and transmits the capture request message in the described exemplary processes, in yet other alternative exemplary security processes the SP system 14 may perform these functions.

The exemplary processes described herein describe operations performed by, and communications sent between, the MC device 12, the SP system 14, and the BAC system 16 that facilitate increasing the security of network-based transactions initiated from, and conducted on, MC devices 12. In alternative processes the operations may be performed, and the communications may be sent, in any order that facilitates increasing the security of network-based transactions as described herein.

Although the transaction policy 24 is stored in the SP system 14, the transaction policy 24 may alternatively, or additionally, be stored in the BAC system 16. Moreover, although the SP system 14 determines the levels of risk 30 for requested network-based transactions in the exemplary security processes described herein, in yet other alternative exemplary security processes the BAC system 16 may determine the levels of risk 30 for requested network-based transactions.

In the exemplary security processes described herein, when there is a discrepancy between the anticipated authentication data and the displayed authentication data requirement, the requesting user decides not to capture authentication data and after a time period expires the requested transaction is cancelled. However, in alternative security processes, instead of waiting for the time period to expire before cancelling the transaction, the requesting user may cancel the requested transaction directly. More specifically, the requesting user may activate a button 18 which causes the MC device 12 to disapprove the requested transaction, generate a cancellation message, and transmit the message to the SP system 14 and the BAC system 16. The cancellation message instructs the SP system 14 and the BAC system 16 to cancel the requested transaction. By virtue of activating the button 18, the requesting user reduces the time required for cancelling the requested transaction.

The information shown in FIG. 9 includes the same information shown in FIGS. 2 and 3 as described in more detail below. As such, features illustrated in FIG. 9 that are identical to features illustrated in FIGS. 2 and 3 are identified using the same reference numerals used in FIGS. 2 and 3.

Figure 9:
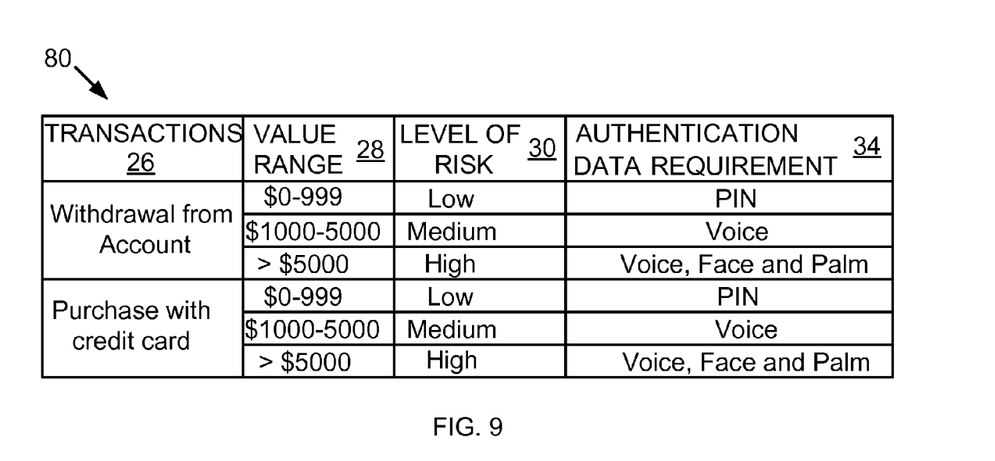
FIG. 9 is a diagram illustrating an exemplary composite policy for directly associating network-based transactions illustrated in FIG. 2 with the authentication data requirements illustrated in FIG. 3.

FIG. 9 is a diagram illustrating an exemplary composite policy 80 for directly associating network-based transactions 26 with authentication data requirements 34, and is designed so that users can readily remember the authentication data requirement 34 for different dollar value transactions 26. The composite policy 80 may be provided to users in any manner. For example, upon enrolling in the SP system 14 a paper copy of the composite policy 80 may be given to users or the composite policy 80 may be stored in the MC device 12. By virtue of knowing the authentication data requirements 34, users are able to anticipate the correct authentication data to be captured during authentication transactions.

The composite policy may be stored in the SP system 14 and additionally, or alternatively, in the BAC system 16 and used for determining at least authentication data requirements 34. Changes to the levels of risk 30 are to be coordinated between the exemplary configurable transaction policy 24, the exemplary configurable authentication policy 32, and the exemplary composite policy 80.

Although the exemplary processes described herein use text dependent speaker recognition techniques, other alternative exemplary processes may use text independent speaker recognition techniques to facilitate increasing the security of network-based transactions conducted over the AC system 10. Such alternative exemplary processes may require users to speak a verbatim summary of all the details of a requested transaction. Yet other alternative exemplary security processes may use both text dependent and text independent speaker recognition techniques to facilitate increasing the security of transactions conducted over the AC system 10.

The processes and systems described herein facilitate increasing the security of network-based transactions 26 initiated from, and conducted on, mobile communications devices, and are believed to be applicable to many different businesses for reducing risks that such network-based transactions 26 will be conducted fraudulently.

In each embodiment, the above-described processes for initiating and conducting network-based transactions on mobile communications devices facilitate enhancing security of systems and resources involved in conducting such transactions. More specifically, authentication data requested to be captured from a user as part of an authentication transaction is compared against authentication data anticipated by the user to be captured during the authentication transaction. When the user decides that the requested authentication data agrees with the anticipated authentication data, the user authenticates the requested transaction. After successfully authenticating the identity of the user, the user is permitted to conduct the network-based transaction from the mobile communications device, if authorized. As a result, authentication system operation facilitates increasing the security of network-based transactions conducted on mobile communications devices to be comparable with out-of-band communications techniques, as well as facilitates reducing the costs, inconvenience and difficulties associated with out-of-band techniques. Accordingly, authentication system performance is facilitated to be enhanced in a cost effective and reliable manner.

Exemplary embodiments of processes for increasing the security of network-based transactions initiated from, and conducted on, mobile communications devices are described above in detail. The processes are not limited to use with the specific authentication computer systems described herein, but rather, the processes can be utilized independently and separately from other authentication computer components described herein. For example, the processes for increasing the security of network-based transactions initiated from, and conducted on, mobile communications devices as described herein may be implemented in most authentication systems and may be used for a wide range of network-based transaction scenarios, including accessing confidential patient medical records. Moreover, the invention is not limited to the embodiments of the methods described above in detail. Rather, other variations of the methods may be utilized within the spirit and scope of the claims.

While the invention has been described in terms of various specific embodiments, those skilled in the art will recognize that the invention can be practiced with modification within the spirit and scope of the claims.

What is claimed is:

1. A method for increasing the security of network-based transactions comprising:
   determining, by a processor, an authentication data requirement based on a transaction requested to be conducted by a user and displaying the authentication data requirement on a mobile communications device, the authentication data requirement being at least a voice phrase that describes details of the requested transaction;
   determining whether the displayed authentication data requirement agrees with an authentication data requirement anticipated by the user for the requested transaction; and
   capturing authentication data from the user in accordance with the displayed authentication data requirement when the displayed authentication data requirement agrees with the anticipated authentication data requirement.

2. A method for increasing the security of network-based transactions in accordance with claim 1, further comprising:
   determining whether authentication data received by the processor from the mobile communications device was captured live from the user; and
   comparing the received authentication data against user enrollment authentication data when the received authentication data was captured live from the user.

3. A method for increasing the security of network-based transactions in accordance with claim 2, said determining whether authentication data received by the processor step comprising:
   randomly selecting live-ness detection data with the processor;
   including the live-ness detection data in a capture request message; and
   determining that the received authentication data was captured live from the user when the live-ness detection data was executed when the received authentication data was captured.

4. A method for increasing the security of network-based transactions in accordance with claim 1, further comprising determining that the user is authorized to conduct the requested transaction prior to conducting the requested transaction.

5. A method for increasing the security of network-based transactions in accordance with claim 1, said determining whether the displayed authentication data requirement agrees with the anticipated authentication data requirement comprising recognizing a discrepancy between the displayed authentication data requirement and the anticipated authentication data requirement when details in the displayed authentication data requirement are different than details of the requested transaction.

6. A method for increasing the security of network-based transactions in accordance with claim 1, further comprising cancelling the requested transaction when the displayed authentication data requirement disagrees with the anticipated authentication data requirement.

7. A method for increasing the security of network-based transactions in accordance with claim 6, said cancelling step comprising activating a mobile communications device button to disapprove the requested transaction.

8. A method for increasing the security of network-based transactions in accordance with claim 6, said cancelling step comprising refusing to capture authentication data.

9. A system for increasing the security of network-based transactions comprising:
   a mobile communications device configured to capture authentication data during authentication transactions and conduct network-based transactions;
   a service provider system including a database and being configured to control access to resources relating to users enrolled therein and to conduct network-based transactions; and
   an authentication system comprising an authentication database, said authentication system, said mobile communications device, and said service provider system being configured to communicate over a network, said authentication system being configured to store at least enrollment authentication data for users and live-ness detection data, determine authentication data requirements and live-ness detection data,
   include at least a determined authentication data requirement in a capture request message,
   transmit the capture request message to said mobile communications device which displays an authentication data requirement for the user to see, and
   authenticate the user when the displayed authentication data requirement agrees with authentication data anticipated for a transaction requested by the user, the displayed authentication data requirement being at least a voice phrase describing the requested transaction details.

10. A system for increasing the security of network-based transactions in accordance with claim 9, said mobile communications device comprising:
    a smart phone;
    a tablet computer;
    a laptop computer;
    a personal computer; or
    a personal digital assistant.

11. A system for increasing the security of network-based transactions in accordance with claim 9, said service provider system being further configured to:
    determine a risk level for the requested transaction;
    include the risk level in an authentication message; and
    transmit the authentication message to said authentication system which determines the authentication data requirement based on the risk level.

12. A system for increasing the security of network-based transactions in accordance with claim 9, said authentication system being further configured to:
    determine an authentication data requirement for the requested transaction;
    randomly select live-ness detection data for the requested transaction; and
    determine that received authentication data was captured live from the user when the live-ness detection data was executed during the authentication transaction in which the received authentication data was captured.

13. A system for increasing the security of network-based transactions in accordance with claim 9, said authentication system being further configured to determine that the displayed authentication data requirement was captured from the user while executing live-ness detection prior to authenticating the user.

14. A method for enhancing the security of systems and resources used for conducting network-based transactions comprising:
    comparing authentication data requested to be captured from a user during an authentication transaction against authentication data anticipated by the user to be captured during the authentication transaction;
    authenticating a transaction requested by the user when the user decides that the requested authentication data agrees with the anticipated authentication data, the requested authentication data being at least a voice phrase describing details of the requested transaction; and
    after successfully authenticating the user, conducting the requested transaction from a mobile communications device.

15. A method for enhancing the security of systems and resources used for conducting network-based transactions in accordance with claim 14, further comprising determining that captured authentication data was captured live from the user prior to said conducting step.

16. A method for enhancing the security of systems and resources used for conducting network-based transactions in accordance with claim 15, said determining step comprising:
    transmitting, to a processor, authentication data captured as part of said authenticating step with live-ness detection data executed when capturing the authentication data; and
    determining that authentication data received by the processor was captured live from the user when the live-ness detection data was executed when the received authentication data was captured.

17. A method for enhancing the security of systems and resources used for conducting network-based transactions in accordance with claim 14, further comprising determining, by a processor, whether the user is authorized to conduct the requested transaction before said conducting step.

18. A method for enhancing the security of systems and resources used for conducting network-based transactions in accordance with claim 14, said authenticating the transaction step comprising:
    capturing, by the mobile communications device, authentication data from the user in accordance with the requested authentication data; and
    transmitting the captured authentication data to a processor.

19. A method for enhancing the security of systems and resources used for conducting network-based transactions in accordance with claim 14, said authenticating the user step comprising:
    comparing user enrollment authentication data against authentication data captured from the user in accordance with the requested authentication data;
    generating a matching score for the comparison; and
    comparing the matching score against a threshold score and successfully authenticating the user when the matching score is at least equal to the threshold score.

* * * * *